(12) United States Patent
Narayana et al.

(10) Patent No.: US 8,824,448 B1
(45) Date of Patent: Sep. 2, 2014

(54) METHOD FOR ENHANCING REDUNDANCY IN A WIRELESS SYSTEM USING LOCATION ATTRIBUTES

(75) Inventors: M. S. Badari Narayana, Santa Clara, CA (US); Kumara Das Karunakaran, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 321 days.

(21) Appl. No.: 12/847,565

(22) Filed: Jul. 30, 2010

(51) Int. Cl.
*H04B 7/212* (2006.01)
*H04W 88/12* (2009.01)

(52) U.S. Cl.
CPC ...................................... *H04W 88/12* (2013.01)
USPC ............ 370/348; 370/329; 370/338; 455/453

(58) Field of Classification Search
CPC .................... H04W 72/0426; H04W 74/0816; H04W 88/12
USPC ............ 370/329, 338, 348; 455/453; 709/220
See application file for complete search history.

(56) References Cited

U.S. PATENT DOCUMENTS

| 7,162,250 | B2* | 1/2007 | Misra ............................ 455/453 |
| 7,302,256 | B1* | 11/2007 | O'Hara et al. ................ 455/418 |
| 2004/0053624 | A1* | 3/2004 | Frank et al. .................... 455/453 |
| 2004/0264398 | A1* | 12/2004 | Chu et al. ....................... 370/312 |
| 2007/0082656 | A1* | 4/2007 | Stieglitz et al. ............... 455/411 |
| 2008/0320108 | A1* | 12/2008 | Murty et al. ................... 709/220 |

\* cited by examiner

*Primary Examiner* — Wanda Z Russell
(74) *Attorney, Agent, or Firm* — Anderson Gorecki & Rouille LLP

(57) ABSTRACT

A method, apparatus and computer program product for enhancing redundancy in a wireless system using location attributes is presented. A First Network Device (FND) receives a discovery message from an Access Point (AP). The FND comprises either a Wireless Controller (WC) or a Wireless Switch (WS). The FND uses the location information associated with the AP to determine how many other APs from a same locality are currently allocated to at least one FND, and assigns the AP to a least loaded FND in the locality.

21 Claims, 5 Drawing Sheets

METHOD FOR ENHANCING REDUNDANCY IN A WIRELESS SYSTEM USING LOCATION ATTRIBUTES

BACKGROUND

Wireless networks have become ubiquitous. A wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or layer of the network.

A wireless network consists of several components. These are WCs (Wireless Controllers), WSs (Wireless Switches), APs (Access Points) and MUs (Mobile Units). An MU is a mobile wireless device like a laptop or a VOIP phone set that communicates with other wired or wireless devices over a wireless network. A wireless AP is a device that allows wireless communication devices (MUs) to connect to wireless and wired networks. A WS receives and switches data traffic sent from several MUs via several APs to an enterprise network A WC handles provisioning, configuration, authentication, load balancing and monitoring of WSs, APs and MUs. The WSs, APs and MUs establish secure control channels to WCs for this purpose and exchange control traffic with it. The Wireless Controllers authenticate WSs, APs, and MUs and control the coordination between them to provide a seamless mobile network to the end users. In some cases, the WC and WS functions may be integrated in one device. In such cases, the term MS (Mobility Switch) will be used.

The AP acts as a bridge between the MUs on the wireless side and WSs/WCs present on the wired side. The AP performs authentication, authorization, accounting and load balancing of MUs by communicating with the WC. After obtaining authorization by WC, the AP tunnels MU data traffic into the WS assigned by WC for switching.

A WS switches data traffic originated by MUs into both wired and wireless networks. The wireless switches allow mobile units (e.g. MUs like laptops, cell phones etc.) to roam among various locations and still have network access.

A typical wireless network may include a Mobility Domain (MD). The MD includes one or more Access Points (APs), one or more Wireless Switches (WSs), one or more Wireless Controllers (WCs) and one or more Mobile Units (MUs) and is centrally managed for provisioning, configuration and monitoring. A mobility domain is typically a single geographic area where a same set of mobility services is provided. A mobility domain can include tens of WCs, hundreds of WSs, thousands of APs, and tens of thousands of MUs. MUs can include laptops, cell phones, Personal Digital Assistants (PDAs) and the like.

MUs (like Laptops, VOIP phones etc) associate with AP, get authenticated and become a part of MD. As they physically roam, they disconnect from one AP in the MD and get attached to another AP in the MD.

Since an AP or a WS sends control traffic to the WC to which it is associated, associating a large number of these entities to a single WC will heavily load the processing power of the WC. Hence when an AP or WS boots up, it contacts a predetermined WC which load balances and distributes these entities to all the WCs in the MD.

There is need for distributing wireless data traffic from APs (originated by MUs attached to the APs) evenly across the WSs so that no WS is burdened too heavily. This distribution function is also done by the WC that performs the load balancing. Traditionally the APs have been load balanced and assigned to WCs either by way of manual configuration or by using a "round robin" or "least loaded WC" methods without using location information. In cases where WC and WS are deployed as separate devices, there is also need to load balance control channel traffic of both APs and WSs to WCs. In all cases, one designated WC does the load balancing of WSs/APs to WCs, and load balancing of APs to WSs.

SUMMARY

Conventional mechanisms such as those explained above suffer from a variety of deficiencies. One such deficiency associated with load balancing of wireless environments using manual configuration is that this process is tedious, labor intensive, and as the wireless system becomes large, becomes unwieldy. A deficiency associated with simple load balancing using "round robin" or "least loaded WS" methods without using location information is that while this method does distribute the load across WSs, it may also introduce congestion over the network links and cause large latency when the WS/WC is situated far away in the network. It also makes trouble shooting harder.

Many existing methods use load on controller as a sole parameter to select a controller for managing a new AP. Some implementations pass the current load from multiple controllers to the APs and let the APs pick the least loaded controller. Some implementations make the decision on the controller itself. But the controllers are either unaware of the locality of the AP or it is ignored for load balancing purpose. Many systems collect AP location information, but is used for reporting or for AP grouping purposes, but the information is not used for load balancing with the intention of improving localized resiliency. One approach possible with existing solution is to perform location aware manual assignment of APs to controllers. However this is not a scalable solution for large deployments where there could be thousands of deployed APs. Assigning each of those APs making sure neighboring APs are assigned to different controllers would be a cumbersome provisioning task.

Using merely the load on a controller for performing load balancing is a simple solution, but can cause huge localized disruptions if a controller fails, especially in centralized deployments where large numbers of APs are managed by a few controllers. It is desirable that neighboring APs are managed by different controllers, which would prevent all APs in a region to lose service simultaneously due to a failure in one of the controllers.

Embodiments of this invention significantly overcome such deficiencies and provide mechanisms and techniques that provide for enhanced redundancy in a wireless system using location attributes. Location attributes of the type Campus-Building-Floor-Sector (C-B-F-S) are configured for each AP, WC and WS. When an AP initializes, it contacts a WC and provides its unique identification information (a serial number or MAC address). The WC uses this identification to lookup the configuration database to retrieve the location information of the connecting AP. Alternately an AP that has already been configured with the location information, may supply it when contacting the WC. The WC uses the location information and spare capacity information to distribute neighboring APs to different controllers. This prevents all APs in a region from losing service simultaneously due to a failure in one of the WCs.

In a particular embodiment of a method for enhancing redundancy in a wireless system using location attributes, the method includes receiving a discovery message from an AP at a First Network Device (FND), either a WC or a WS. The method further includes using, by the FND, location information associated with the AP to determine how many other APs from a same locality are currently allocated to at least one FND (aka local load of FND). Additionally the method includes assigning the AP to a FND which has the least local load in the locality.

Other embodiments include a computer readable medium having computer readable code thereon for enhancing redundancy in a wireless system using location attributes. The computer readable medium includes instructions for receiving a discovery message from an AP at a FND. The computer readable medium further includes instructions for using, by the FND, location information associated with the AP to determine how many other APs from a same locality are currently allocated to at least one FND. Additionally the computer readable medium includes instructions for assigning the AP to a least loaded FND in the locality.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process for enhancing redundancy in a wireless system using location attributes as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for enhancing redundancy in a wireless system using location attributes as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
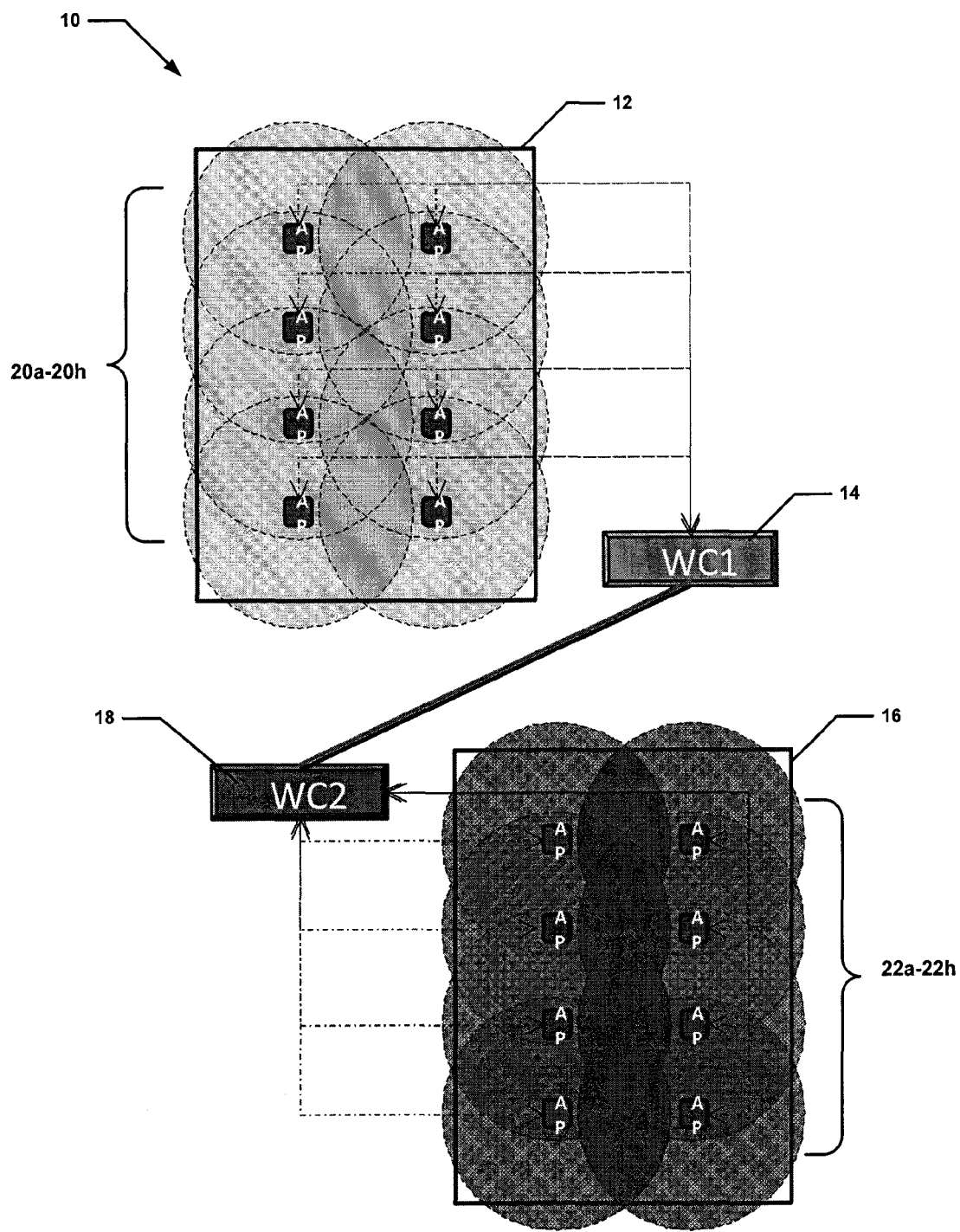
FIG. 1 depicts a diagram of an example mobility domain.

Referring to FIG. 1, a prior art Mobility Domain (MD) 10 is shown. The MD 10 includes a first locality 12 including eight APs (20a-20h). All of these APs 20a-20h are associated with wireless controller 14 (WC1). Mobility domain 10 also includes a second locality 16. The second locality 16 also includes eight APs 22a-22h. All of these APs 22a-22h are associated with wireless controller 18 (WC2).

Figure 2:
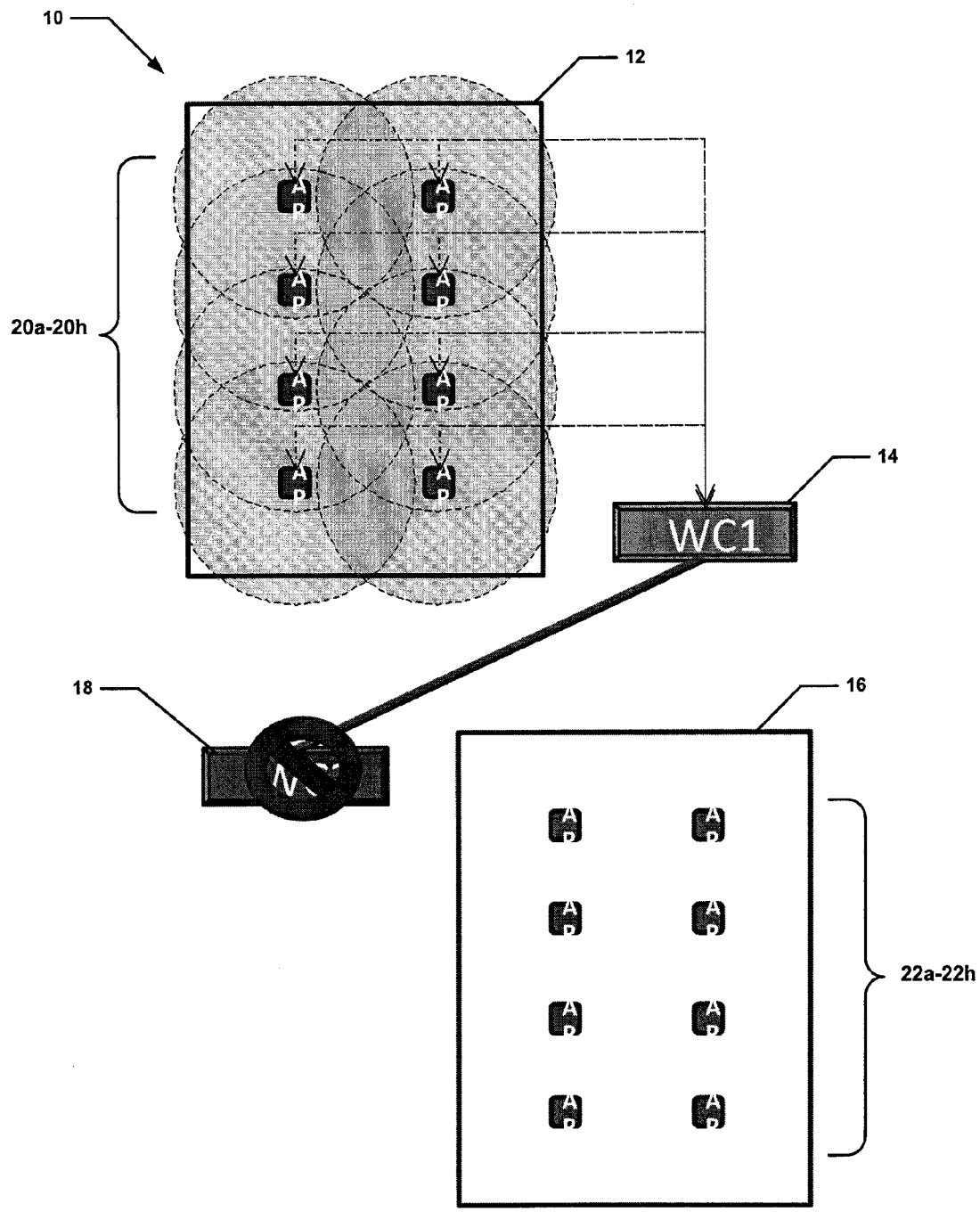
FIG. 2 is a diagram of the mobility domain of FIG. 1, wherein a WC has failed.

Referring now to FIG. 2, the same MD 10 is shown as in FIG. 1, however in this figure, WC 18 has failed. Since APs 22a-22h are associated with the same WC (WC 18), as a result of this failure, all the APs 22a-22h go down. Clients (e.g., MUs) associated with any of APs 22a-22h cannot migrate to adjacent APs and therefore they lose connectivity.

Figure 3:
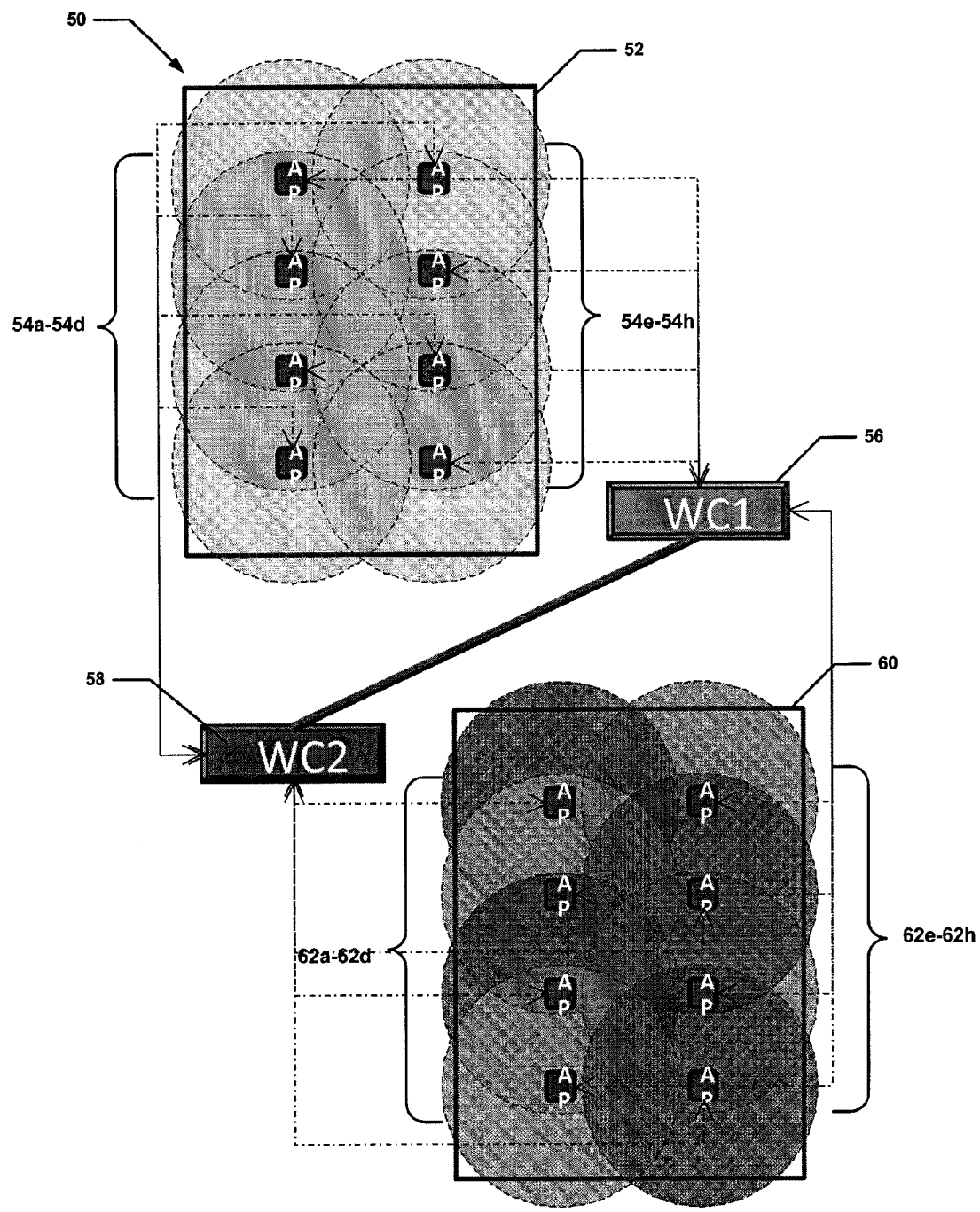
FIG. 3 depicts a block diagram view of an example mobility domain in accordance with embodiments of the invention.

Referring now to FIG. 3, a Mobility Domain (MD) 50 in accordance with embodiments of the present invention is shown. The mobility domain 50 includes a first locality 52 including eight APs (54a-54h). Four of theses APs 54a-54d are associated with wireless controller 58 (WC2). The remaining four of theses APs 54e-54h are associated with wireless controller 56 (WC1). Mobility domain 50 also includes a second locality 60. The second locality 60 also includes eight APs 62a-62h. Four of theses APs 62a-62d are associated with wireless controller 58 (WC2). The remaining four of theses APs 62e-62h are associated with wireless controller 56 (WC1).

In accordance with the present invention, to prevent loss of coverage in a locality (e.g. a region within a floor, a complete floor, a complete building or campus), neighboring APs connect to different controllers and/or mobility switches. The enhanced redundancy solution which assigns new APs to controllers has some location awareness in addition to current load on each controller to make this happen. Neighboring APs are distributed among available controllers with spare capacity.

The methodology has the following components: an automated mechanism to capture location of individual APs in a floor plan during provisioning phase; a load balancing module within the wireless controller which uses the location information and spare capacity information in available controllers to distribute neighboring APs to different controllers; and a discovery protocol for APs to discover and become managed by wireless controller.

During provisioning and site survey phase, a floor plan model is created where APs are placed on the floor plan for various management operations, mostly heat maps, location information etc. This tool is used to capture four location attributes for each AP-Campus, Building, Floor, Sector (C-B-F-S) and the Wireless Management System (WMS) configures this information on the wireless controllers. This allows an easy automated way to capture physical location of each AP on the deployed floor space.

When an AP is powered up, it uses information from DHCP (or other mechanisms like static configuration) to contact one of the Wireless Controllers using the discovery protocol. The Wireless Controller which receives the discovery message looks up the AP on its database where the location attributes are configured. It then uses the C-B-F-S information to determine how many APs from that locality (e.g. sector or floor) are currently allocated to the various controllers. The new AP is then assigned to the least loaded controller from that list, essentially making sure that APs in the same locality or zone are distributed evenly across the available controllers.

Figure 4:
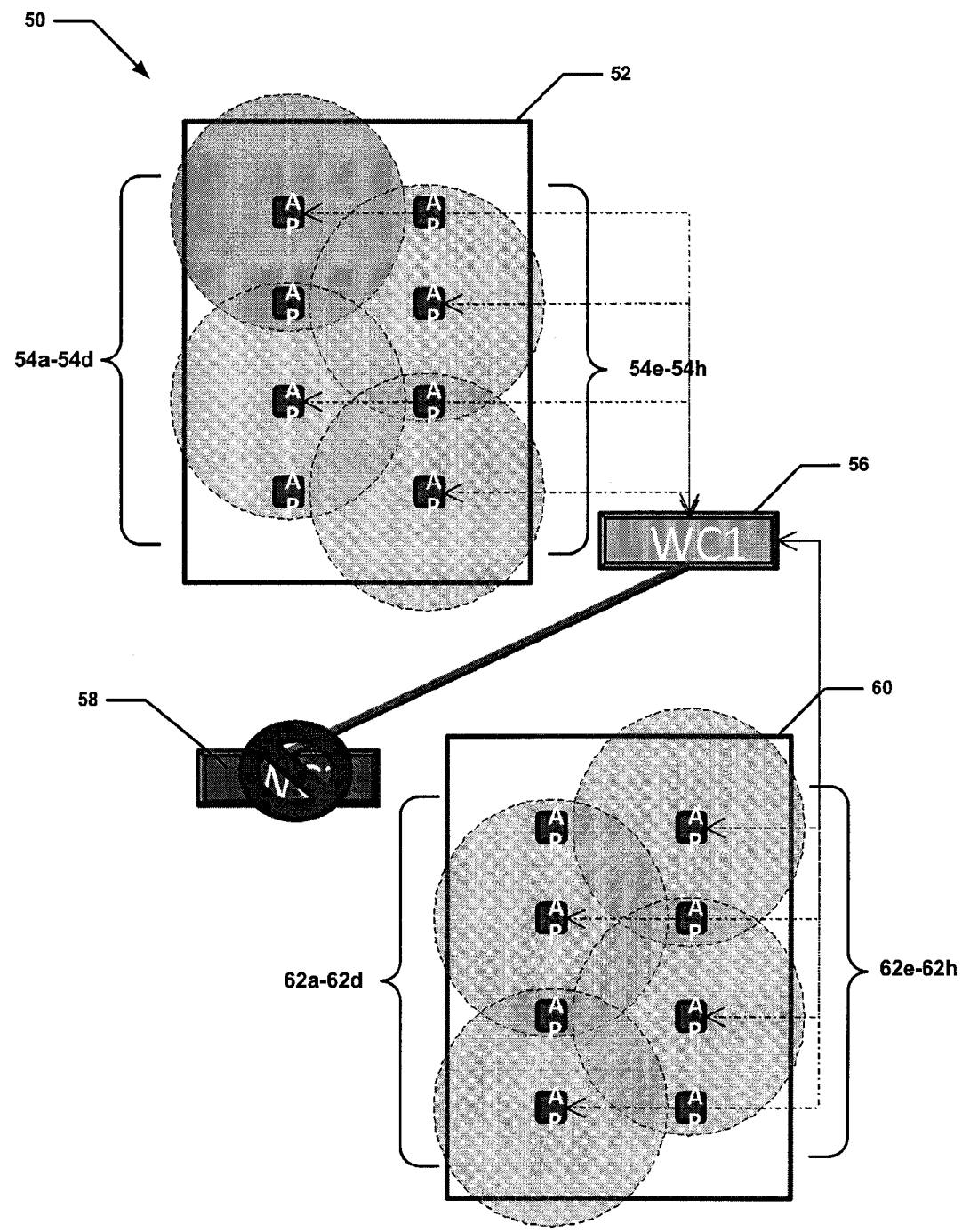
FIG. 4 is a diagram of the mobility domain of FIG. 3, wherein a WC has failed.

With such an arrangement, if one of the controllers fails, coverage holes may be created within a zone, but the entire zone will not lose coverage. This will allow clients (e.g., MUs) to migrate (roam) to the neighboring APs at a much faster rate and continue their application sessions. This is shown in FIG. 4, wherein the same MD 50 is shown as in FIG. 3, however in this figure, WC 58 has failed. As a result of this failure, clients associated with APs 62a-62d can migrate to RF adjacent AP's (e.g., APs 62e-62h) connected to WC1 and continue to function.

The algorithm can be further optimized by utilizing RF Scan information collected by the APs about their neighboring APs. The algorithm can distribute APs, which are RF neighbors, to different controllers so that on a controller failure, an AP can easily migrate to a new RF Neighbor AP which is attached to a different controller. This will allow additional load balancing since an RF neighborhood may be different from physical neighborhood depending on the obstacles in the path between two APs. However, it should be noted that this cannot be used as a primary source for localized load balancing since RF scan database is not available when APs come up one at a time and it typically takes anywhere from a few minutes to some hours to build a stable scan database. So floor plan based location attributes are essential to make an initial choice and this choice can be further optimized based on the RF scan data.

The above-described methodology is not limited to load balancing APs to Wireless Controllers. In other architectures where the wireless control plane and data plane are split across a WC (Wireless Controller) and a WS (wireless Switch) this principle can be applied to enhance redundancy by independently assigning the APs from the same location (as specified by it's location attribute) to different WCs (for example a Linux box running WC control software) and to different WSs (for example, a unified wired-wireless switch running the data plane switching software).

Figure 5:
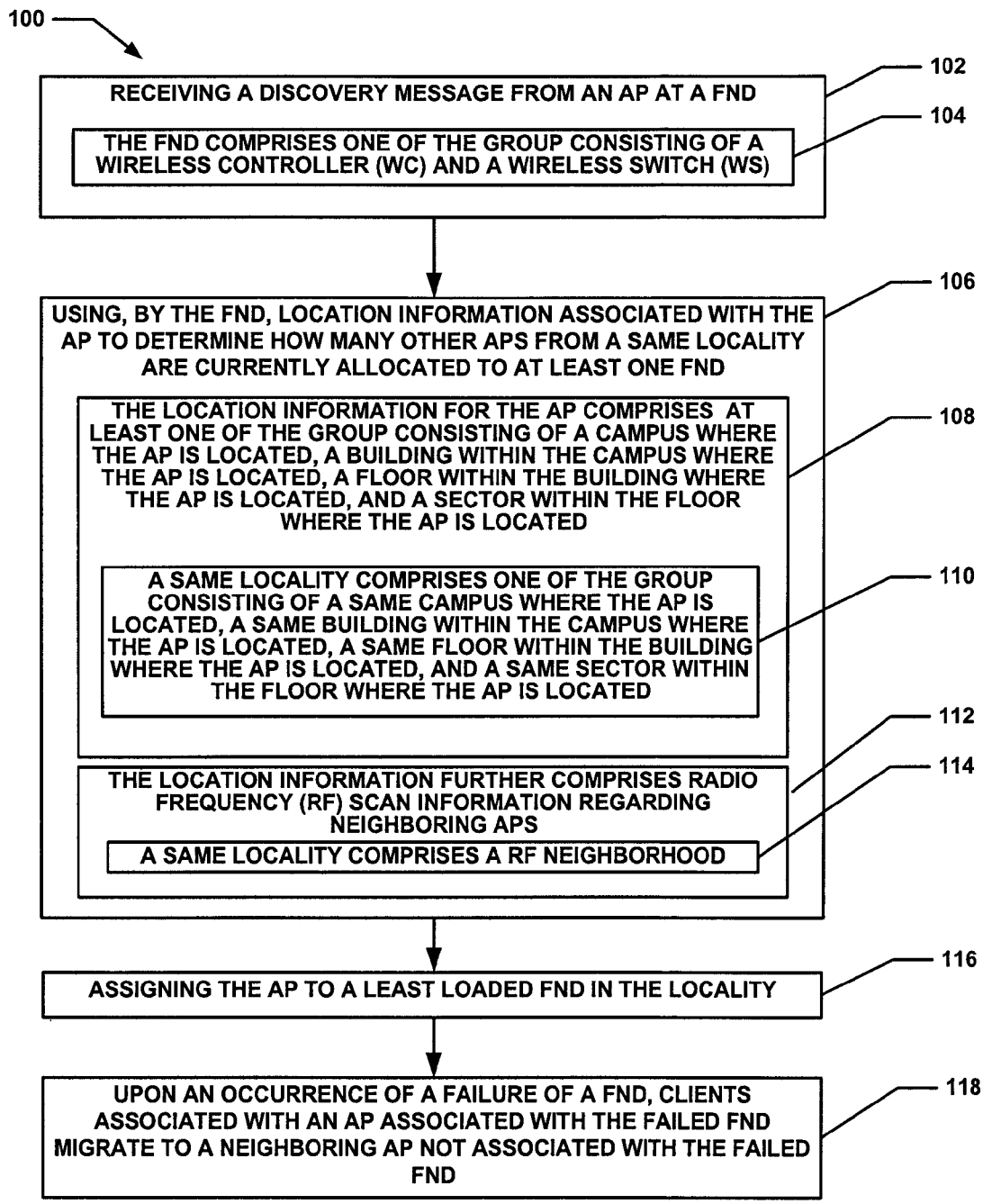
FIG. 5 depicts a flow diagram of a method for providing enhanced redundancy in a wireless system using location attributes in accordance with embodiments of the invention.

Referring now to FIG. 5, a particular embodiment of a method 100 for enhancing redundancy in a wireless system using location attributes is shown. Method 100 starts with processing block 102 which discloses receiving a discovery message from an AP at a FND. As further disclosed in processing block 104, the FND comprises one of the group consisting of a Wireless Controller (WC) and a Wireless Switch (WS).

Processing block 106 states using, by the FND, location information associated with the AP to determine how many other APs from a same locality are currently allocated to at least one FND. As shown in processing block 108, the location information for the AP comprises at least one of the group consisting of a campus where the AP is located, a building within the campus where the AP is located, a floor within the building where the AP is located, and a sector within the floor where the AP is located. As further shown in processing block 110 a same locality comprises one of the group consisting of a same campus where the AP is located, a same building within the campus where the AP is located, a same floor within the building where the AP is located, and a same sector within the floor where the AP is located.

In certain embodiments, as recited in processing block 112, the location information further comprises Radio Frequency (RF) scan information regarding neighboring APs. As disclosed in processing block 114, when the location information includes RF scan information, then a same locality comprises a RF neighborhood. The algorithm can distribute APs, which are RF neighbors, to different controllers so that on a controller failure, an AP can easily migrate to a new RF Neighbor AP which is attached to a different controller. This will allow additional load balancing since an RF neighborhood may be different from physical neighborhood depending on the obstacles in the path between two APs.

Processing block 116 states assigning the AP to a least loaded FND in the locality. The new AP is assigned to the least loaded controller from that list, essentially making sure that APs in the same locality or zone are distributed evenly across the available controllers.

Processing block 118 recites upon an occurrence of a failure of a FND, clients (aka MUs) associated with an AP that is associated with the failed FND migrate to a neighboring AP not associated with the failed FND. With such an arrangement, if one of the controllers fails, coverage holes may be created within a zone, but the entire zone will not lose coverage. This will allow clients to migrate (roam) to the neighboring APs at a much faster rate and continue their application sessions.

The above described method and apparatus for providing enhanced redundancy using location attributes provides several advantages over conventional methods. Having neighboring APs managed by different controllers prevents all APs in a region to lose service simultaneously due to a failure in one of the controllers. If one of the controllers fail, coverage holes may be created within a zone, but the entire zone will not lose coverage. This will allow clients to migrate (roam) to the neighboring APs at a much faster rate and continue their application sessions.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which an Access Point (AP) is coupled to a First Network Device (FND) comprising:
receiving a discovery message from an AP at a FND;
using, by said FND, location information associated with said AP to determine how many other APs from a same locality are currently allocated to at least one FND;
assigning said AP to a least loaded FND in said locality while insuring that neighboring APs are assigned to different FNDs.

2. The method of claim 1 wherein said FND comprises one of the group consisting of a Wireless Controller (WC) and a Wireless Switch (WS).

3. The method of claim 1 wherein said location information for said AP comprises at least one of the group consisting of a campus where said AP is located, a building within said campus where said AP is located, a floor within said building where said AP is located, and a sector within said floor where said AP is located.

4. The method of claim 1 wherein said a same locality comprises one of the group consisting of a same campus where said AP is located, a same building within said campus where said AP is located, a same floor within said building where said AP is located, and a same sector within said floor where said AP is located.

5. The method of claim 2 wherein said location information further comprises Radio Frequency (RF) scan information regarding neighboring APs.

6. The method of claim 1 further comprising upon an occurrence of a failure of a FND, a client associated with an AP that is associated with the failed FND migrates to a neighboring AP not associated with said failed FND.

7. The method of claim 1 wherein managing neighboring APs by different controllers prevents all APs in a region from losing service simultaneously due to a failure in one of the controllers.

8. A first network device (FND) comprising:
a memory;
a processor;
a communications interface;
an interconnection mechanism coupling the memory, the processor and the communications interface; and
wherein the memory is encoded with an application providing load balancing, that when performed on the processor, provides a process for processing information, the process causing the FND to perform the operations of:

receiving a discovery message from an Access Point (AP);

using, by said FND, location information associated with said AP to determine how many other APs from a same locality are currently allocated to at least one FND; and assigning said AP to a least loaded FND in said locality while insuring that neighboring APs are assigned to different FNDs.

9. The first network device of claim 8 wherein said FND comprises one of the group consisting of a Wireless Controller (WC) and a Wireless Switch (WS).

10. The first network device of claim 8 wherein said location information for said AP comprises at least one of the group consisting of a campus where said AP is located, a building within said campus where said AP is located, a floor within said building where said AP is located, and a sector within said floor where said AP is located.

11. The first network device of claim 8 wherein said a same locality comprises one of the group consisting of a same campus where said AP is located, a same building within said campus where said AP is located, a same floor within said building where said AP is located, and a same sector within said floor where said AP is located.

12. The first network device of claim 9 wherein said location information further comprises Radio Frequency (RF) scan information regarding neighboring APs.

13. The first network device of claim 8 further comprising upon an occurrence of a failure of a FND, a client associated with an AP that is associated with the failed FND migrates to a neighboring AP not associated with said failed FND.

14. The first network device of claim 8 wherein managing neighboring APs by different controllers prevents all APs in a region from losing service simultaneously due to a failure in one of the controllers.

15. A non-transitory computer readable storage medium having computer readable code thereon for providing Access Point (AP) load balancing, the medium including instructions in which a First Network Device (FND) performs operations comprising:

receiving a discovery message from an AP at the FND;

using, by said FND, location information associated with said AP to determine how many other APs from a same locality are currently allocated to at least one FND; and assigning said AP to a least loaded FND in said locality, while insuring that neighboring APs are assigned to different FNDs.

16. The method of claim 15 wherein said FND comprises one of the group consisting of a Wireless Controller (WC) and a Wireless Switch (WS).

17. The method of claim 15 wherein said location information for said AP comprises at least one of the group consisting of a campus where said AP is located, a building within said campus where said AP is located, a floor within said building where said AP is located, and a sector within said floor where said AP is located.

18. The method of claim 15 wherein said a same locality comprises one of the group consisting of a same campus where said AP is located, a same building within said campus where said AP is located, a same floor within said building where said AP is located, and a same sector within said floor where said AP is located.

19. The method of claim 16 wherein said location information further comprises Radio Frequency (RF) scan information regarding neighboring APs.

20. The method of claim 15 further comprising upon an occurrence of a failure of a FND, a client associated with an AP that is associated with the failed FND migrates to a neighboring AP not associated with said failed FND.

21. The computer readable storage medium of claim 15 wherein managing neighboring APs by different controllers prevents all APs in a region from losing service simultaneously due to a failure in one of the controllers.

* * * * *